US008355486B2

(12) United States Patent
Gupta

(10) Patent No.: US 8,355,486 B2
(45) Date of Patent: Jan. 15, 2013

(54) SYSTEM AND METHOD FOR INBOUND CALL BILLING

(75) Inventor: Shekhar Gupta, Overland Park, KS (US)

(73) Assignee: CenturyLink Intellectual Property LLC, Denver, CO (US)

(*) Notice: Subject to any disclaimer, the term of this patent is extended or adjusted under 35 U.S.C. 154(b) by 1135 days.

(21) Appl. No.: 11/980,894

(22) Filed: Oct. 31, 2007

(65) Prior Publication Data
US 2009/0110163 A1 Apr. 30, 2009

(51) Int. Cl.
*H04M 15/00* (2006.01)
*G06F 15/00* (2006.01)

(52) U.S. Cl. ........... 379/114.01; 235/380; 340/7.1; 340/7.22; 340/870.02; 370/389; 379/114.15; 379/120; 379/133; 379/144.01; 379/230; 455/406; 455/408; 455/426.1; 455/432.1; 705/15; 705/34; 705/43; 705/44; 709/204; 709/227; 709/228; 715/728

(58) Field of Classification Search ........... 340/7.22, 340/7.1, 870.02; 379/114.01, 114.15, 114.17, 379/112.01, 120, 127.03, 127.01, 144.2, 379/188, 144.01, 133, 210.01, 211.02, 215.01, 379/218.01, 220.01, 230, 265.01, 114.2; 455/406, 408, 426.1, 432.1; 709/228, 204, 709/227; 705/43, 44, 15, 34; 235/380; 370/389, 370/328; 715/728
See application file for complete search history.

(56) References Cited

U.S. PATENT DOCUMENTS

| 4,555,592 | A | | 11/1985 | Deinzer |
| 5,138,651 | A | | 8/1992 | Sudo |
| 5,327,488 | A | * | 7/1994 | Garland .............. 379/215.01 |
| 5,357,564 | A | * | 10/1994 | Gupta et al. .............. 379/188 |
| 5,463,686 | A | * | 10/1995 | Lebourges .............. 379/221.07 |
| 5,509,055 | A | * | 4/1996 | Ehrlich et al. .............. 379/133 |
| 5,712,624 | A | * | 1/1998 | Ayerst et al. .............. 340/7.22 |
| 5,907,802 | A | * | 5/1999 | Scott .............. 455/406 |
| 5,920,701 | A | | 7/1999 | Miller et al. |
| 5,933,483 | A | * | 8/1999 | Pellegrino et al. ....... 379/207.13 |
| 5,940,755 | A | * | 8/1999 | Scott .............. 455/426.1 |
| 5,943,406 | A | * | 8/1999 | Leta et al. .............. 379/120 |
| 6,032,134 | A | | 2/2000 | Weissman |
| 6,058,173 | A | * | 5/2000 | Penfield et al. ......... 379/114.17 |
| 6,098,878 | A | * | 8/2000 | Dent et al. .............. 235/380 |
| 6,101,480 | A | | 8/2000 | Conmy et al. |
| 6,208,266 | B1 | * | 3/2001 | Lyons et al. .............. 340/870.02 |
| 6,321,078 | B1 | | 11/2001 | Menelli et al. |
| 6,377,993 | B1 | * | 4/2002 | Brandt et al. .............. 709/227 |
| 6,445,912 | B1 | * | 9/2002 | Cole et al. .............. 455/406 |
| 6,480,591 | B1 | * | 11/2002 | Penfield et al. ......... 379/144.01 |
| 6,574,324 | B1 | * | 6/2003 | Malik .............. 379/210.01 |
| 6,618,472 | B2 | * | 9/2003 | Culli et al. .............. 379/121.01 |
| 6,633,637 | B1 | * | 10/2003 | Garland et al. .............. 379/230 |
| 6,694,003 | B1 | * | 2/2004 | Karam .............. 379/211.02 |

(Continued)

OTHER PUBLICATIONS

Response filed Oct. 25, 2010 for U.S. Appl. No. 11/980,904.

(Continued)

*Primary Examiner* — Gerald Gauthier
(74) *Attorney, Agent, or Firm* — Swanson & Bratschun, L.L.C.

(57) ABSTRACT

A system and method for billing an incoming communication. A code is received from a calling party during the incoming communication. Expenses of the incoming communication are allocated to an account of the calling party in response to receiving the code. An invoice is generated for the calling party and a receiving party specifying the expenses.

20 Claims, 6 Drawing Sheets

U.S. PATENT DOCUMENTS

| | | | |
|---|---|---|---|
| 6,859,417 B1 | 2/2005 | Houg | |
| 6,917,678 B2* | 7/2005 | Cox et al. | 379/218.02 |
| 6,956,941 B1* | 10/2005 | Duncan et al. | 379/265.01 |
| 6,975,594 B1 | 12/2005 | Byers | |
| 7,005,963 B1* | 2/2006 | Scalisi et al. | 340/7.1 |
| 7,043,228 B2* | 5/2006 | Uppal et al. | 455/406 |
| 7,065,339 B2* | 6/2006 | Vallinen et al. | 455/406 |
| 7,236,768 B2* | 6/2007 | Levitan | 455/406 |
| 7,257,209 B2* | 8/2007 | Gruchala et al. | 379/127.01 |
| 7,257,388 B2* | 8/2007 | Bayne | 455/406 |
| 7,353,212 B1 | 4/2008 | Darcy et al. | |
| 7,397,763 B2 | 7/2008 | Bradd | |
| 7,492,758 B2 | 2/2009 | Kusnitz et al. | |
| 7,587,512 B2 | 9/2009 | Ta et al. | |
| 7,593,874 B1* | 9/2009 | Yoshizawa et al. | 705/34 |
| 7,627,529 B1* | 12/2009 | Bauer et al. | 705/44 |
| 7,773,735 B2* | 8/2010 | Rudolph | 379/114.2 |
| 7,917,139 B2* | 3/2011 | Jiang | 455/432.1 |
| 7,917,581 B2* | 3/2011 | Moore et al. | 709/204 |
| 7,962,120 B2* | 6/2011 | Cai et al. | 455/406 |
| 8,139,748 B2* | 3/2012 | Pines et al. | 379/218.01 |
| 2001/0040949 A1 | 11/2001 | Blonder et al. | |
| 2002/0141561 A1* | 10/2002 | Duncan et al. | 379/220.01 |
| 2003/0044654 A1 | 3/2003 | Holt | |
| 2003/0212600 A1* | 11/2003 | Hood et al. | 705/15 |
| 2004/0208303 A1 | 10/2004 | Rajagopalan et al. | |
| 2005/0152524 A1 | 7/2005 | Carlson et al. | |
| 2005/0175181 A1 | 8/2005 | Bergs et al. | |
| 2006/0177029 A1* | 8/2006 | Dotan et al. | 379/114.01 |
| 2006/0178962 A1* | 8/2006 | Apicella et al. | 705/34 |
| 2006/0252425 A1* | 11/2006 | Jiang | 455/432.1 |
| 2007/0214076 A1 | 9/2007 | Robida et al. | |
| 2007/0226003 A1 | 9/2007 | Zapiec et al. | |
| 2008/0049787 A1 | 2/2008 | McNaughton et al. | |
| 2008/0130849 A1* | 6/2008 | Mock et al. | 379/114.01 |
| 2008/0287099 A1* | 11/2008 | Zonana | 455/408 |
| 2008/0288401 A1* | 11/2008 | Jones et al. | 705/43 |
| 2008/0288991 A1 | 11/2008 | Smoyer et al. | |
| 2008/0317023 A1* | 12/2008 | Stuttgen | 370/389 |
| 2009/0006229 A1 | 1/2009 | Sweeney et al. | |
| 2009/0013255 A1* | 1/2009 | Yuschik et al. | 715/728 |
| 2009/0064252 A1 | 3/2009 | Howarter et al. | |
| 2009/0110163 A1* | 4/2009 | Gupta | 379/114.01 |
| 2009/0234996 A1 | 9/2009 | Bugenhagen | |
| 2009/0248864 A1 | 10/2009 | Bugenhagen | |
| 2009/0257359 A1 | 10/2009 | Bugenhagen | |

OTHER PUBLICATIONS

Non-Final Rejection date mailed Jul. 23, 2010 in U.S. Appl. No. 11/980,904.

Edell et al., "Providing Internet Access: What we learn from the INDEX Trial", INDEX Project Report #99-010, Apr. 1999, 18 pages.

Ricciato et al., "Routing Demands With Time-Varying Bandwidth Profiles on a MPLS Network", Computer Networks, Aug. 2004, 15 pages.

U.S. Appl. No. 11/823,791; Final Rejection dated May 14, 2010; 40 pages.

U.S. Appl. No. 11/823,791; Final Rejection dated May 28, 2009; 25 Pages.

U.S. Appl. No. 11/823,791; Non-Final Rejection dated Nov. 13, 2009; 36 pages.

U.S. Appl. No. 11/823,791; Non-final Rejection dated Dec. 10, 2008; 18 pages.

* cited by examiner

FIG. 7

| | Graphical User Interface | | 700 |
|---|---|---|---|

✓ Add Project Designator  708      702 | Username | SGupta

[ Project ▼ ]     704 | Password | ********

706 | Customer Code | 24548

710 Emergency Dialing Active ✓

712 Emergency Dialing Number: 211

**Dial your customer code + 211 in the event of an emergency

714 Communications Expenses

716 ☐ Phone number: 972-999-9999     718 ☐ Phone number: 972-999-9998

720 ☐ Cost per minute: $.05     722 ☐ Cost per minute: $.20

724 ☐ Hourly Rate: $200/hour     726 ☐ Hourly Rate: $250/hour

728 ☐ Flat fee cost: $5

| 730 Caller Identification | 734 Date | 738 Mins | 742 Total Cost | | 732 Caller Identification | 736 Date | 740 Mins | 744 Total Cost |
|---|---|---|---|---|---|---|---|---|
| 1-214-999-9999 | 010409 | 45 | 152.25 | | 1-214-999-9998 | 012109 | 5 | 26.83 |
| Anonymous | 010509 | 30 | 101.50 | | Blocked | 012509 | 25 | 114.17 |
| 1-214-997-9997 | 012609 | 15 | 50.75 | | Anonymous | 012609 | 15 | 70.50 |
| 1-214-999-9999 | 012709 | 10 | 33.83 | | - | 012709 | 90 | 398.00 |
| 1-469-999-9999 | 013009 | 60 | 203.00 | | 1-469-999-9999 | 013009 | 1 | 9.40 |

| January Totals | 746 160 mins | 750 $541.33 | | January Totals | 748 136 mins | 752 $618.90 |
|---|---|---|---|---|---|---|

SYSTEM AND METHOD FOR INBOUND CALL BILLING

BACKGROUND

The use of and development of communications has grown nearly exponentially in recent years. The growth is fueled by larger networks with more reliable protocols and better communications hardware available to service providers and consumers. Users have similarly grown to expect better communications from home, work, and on the go. Many users often use communications devices to carry on business based on well-established customer or client relationships.

Many businesses and organizations bill a customer or customers for the time spent communicating in order to recuperate expenses related to the communications, such as long distance bills and wireless minutes, and to cover the hourly expenses or salary of one or more employees. It is important to track this time in order to accurately bill the customer and to recover the aforementioned expenses. Existing systems may allow a user to bill customers for outgoing calls. However, many existing systems do not address incoming calls. As a result, each month a user may be required to separate or invoice expenses for multiple business customers and, in some cases, personal usage. The process may be time consuming because the user may have limited information regarding the time and type of communication. In many cases, the issue may be further complicated if the user cannot remember whether the communication was for a business or personal purpose.

SUMMARY

One embodiment provides a system and method for billing an incoming communication. A code may be received from a calling party during the incoming communication. Expenses of the incoming communication may be allocated to an account of the calling party in response to receiving the code. An invoice may be generated for the calling party and a receiving party specifying the expenses.

Another embodiment includes a billing system for separating billable expenses. The billing system may include a server configured to track the billable expenses associated with an incoming communication based on a code received from the calling party and allocate the billable expenses related to the communication to an account of the calling party at the end of the incoming communication. The billing system may also include a communications network in communication with the server. The communications network may be configured to receive the incoming communication from the calling party.

Yet another embodiment includes a billing system for billable expenses. The system may include a processor for executing a set of instructions and a memory for storing the set of instructions. The set of instructions may receive a code from a calling party during the incoming communication, allocate the billable expenses of the incoming communication to an account of the calling party in response to receiving the code, and generate an invoice for the calling party and a receiving party specifying the billable expenses.

BRIEF DESCRIPTION OF THE DRAWINGS

Illustrative embodiments of the present invention are described in detail below with reference to the attached drawing figures, which are incorporated by reference herein and wherein:

FIG. 7 is a graphical user interface in accordance with an illustrative embodiment.

DETAILED DESCRIPTION OF THE DRAWINGS

Illustrative embodiments of the present invention provide a system and method for inbound call billing. Businesses, organizations, and users may have difficulty separating incoming calls based on categories and customers for billing purposes. An individual user or small business may have difficulties separating telecommunication services into categories which may include business and personal usage. An illustrative embodiment may allow a caller to specify different categories for characterizing billable expenses related to an incoming communication. In particular, a caller may specify an account code or identifier, password, category code, or other designator, hereinafter referred to as a "code," for billing the telecommunication expenses, flat fees, and/or a user's time associated with the call to the caller. The code or another specialized number may also be used to bypass features, such as do-not-disturb, call blocking, or other similar features based on emergencies or other unexpected situations in which the caller needs to contact the user.

The billing systems and methods herein described may be part of all communications services provided to a user. In another embodiment, the user may be required to sign up for a service plan, package, or feature in order to have the ability to separate inbound calls and related expenses for billing purposes. For example, in order to be granted access to a graphical user interface for setting communications separation criteria or manually selecting selection criteria, the user may be required to subscribe to a particular communications service package. In one embodiment, the service plan may establish the instructions, rules, policies, and principles for implementing the methods herein described. The service plan may be implemented by software instructions, hardware, or a combination thereof.

Figure 1:
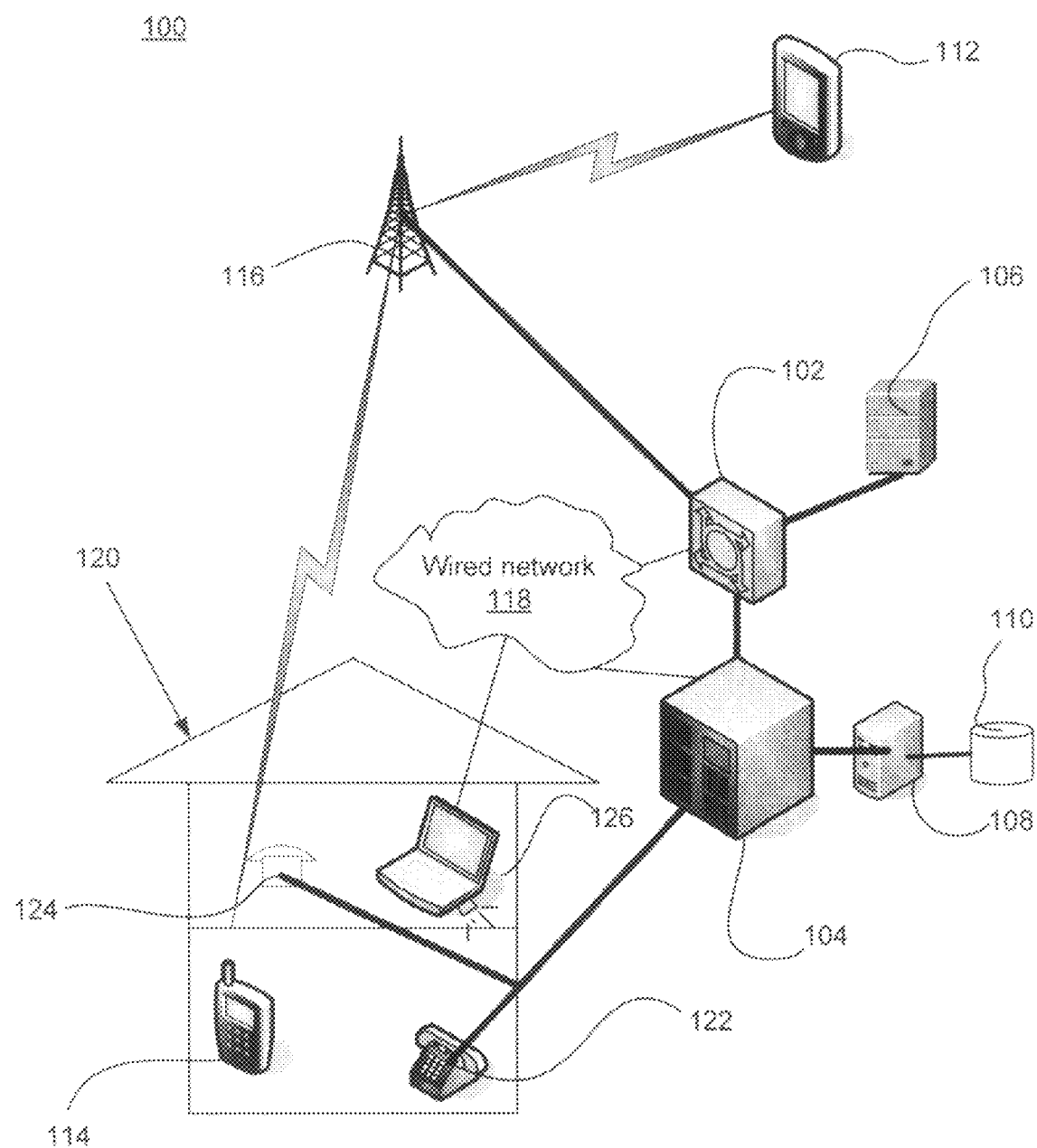
FIG. 1 is a perspective drawing of a communications system according to an embodiment.

FIG. 1 is a perspective drawing of a communications system in accordance with an illustrative embodiment. The communications system of FIG. 1 includes various elements used for wireless and wired communication. The communications system 100 includes a mobile switching center (MSC) 102, a local exchange 104, billing systems 106 and 108, database 110, wireless devices 112 and 114, transmission tower 116, wired network 118, a home 120, home telephones 122 and 124, and client 126. In one embodiment, the different elements and components of the communications system 100 communicate using wireless communications including satellite connections or hardwired connections, such as fiber optics, T1, cable, DSL, high-speed trunks, and telephone lines.

The wireless devices 112 and 114 may communicate with the transmission tower 116 using communications protocols, such as time division multiple access (TDMA), code division multiple access (CDMA), global systems for mobile (GS communications, personal communications systems (CS), WAN, WiMAX, or other frequently used cellular and data communications protocols and standards. The wireless devices 112 and 114 may include cellular phones, Blackberry®, personal digital assistances (PDA), laptops, evolution data optimized (EDO) cards, multi-mode devices, and other wireless communication devices and elements. Communications within the communications system 100 may occur on any number of networks which may include wireless networks, data or packet networks, private networks, publicly-switched telephone networks (PSTN), and the wired network 118. The networks of the communications system 100 may represent a single communication service provider or multiple communications services providers. The features of the present invention may be implemented by one or more elements of the communications system 100 independently or as a networked implementation.

In one embodiment, the MSC 102, billing system 106, and transmission tower 116 are part of a wireless network that is operated by a wireless service provider. For example, the control signals and operational features may be performed by the mobile switching center 102 and the wireless signals may be broadcast from the transmission tower 116 to the wireless devices 112 and 114. The wireless network may include any number of systems, towers, servers, and other network and communications devices for implementing the features and performing the methods herein described.

The MSC 102 may be a switch used for wireless call control and processing. The MSC 102 may also serve as a point of access to the local exchange 104. The MSC 102 is a telephone exchange that provides circuit switched calling and mobility management and may also provide GSM, CDMA, personal communications system (PCS), or other cellular services to the wireless devices 112 and 114 located within the area the MSC 102 serves. The MSC 102 may include a home locator record (HLR) and virtual locator record (VLR) that may be used to implement different features of illustrative embodiments.

The billing system 106 may be an integrated part of the MSC 102 or, alternatively, may be an externally connected device. In one embodiment, the billing system 106 may include an integrated or network database for storing customer and communication usage information and data. The billing system 106 may store information and preferences for categorizing and sorting communications and communication-related expenses into the categories defined by the user. The categorization may be made based on manual or automatic user input. The MSC 102 and billing system 106 may include any number of hardware and software components. In one embodiment, the MSC 102 is an advanced intelligence network device with software modules equipped to perform billing functions.

The local exchange 104 and MSC 102 communicate using a signal control protocol, such as a signaling system number 7 (SS7) protocol. The SS7 protocol is used in publicly-switched networks to establish connections between switches, performing out-of-band signaling in support of the call-establishment, billing, routing, and information-exchange functions of the publicly-switched network 104. In addition to using SS7, a VoIP featured server may be used to implement call controlling. The local exchange 104 may be owned and operated by a local exchange carrier that provides standard telephone or VoIP service to any number of users. In one embodiment, the local exchange 104 may be a class 5 switch that is part of the network systems of the local carrier. The local exchange 104 may include or, may be connected to, the billing system 106. However, the local exchange 104 may also be a Digital Subscriber Line Access Multiplexer (DSLAM), Internet Protocol (IP) gateway, base station, or any other suitable network access point.

The local exchange 104 may be a wire-line switch or public exchange using time domain multiplexing to provide telecommunications services to a particular subscriber or groups of subscribers. The local exchange 104 may be located at a local telephone company's central office or at a business location serving as a private branch exchange. The local exchange 104 may provide dial-tone, calling features and additional digital and data services to subscribers, such as home phones 122 and 124. The local exchange 104 may also enable VoIP communication of the home telephones 122 and 124 through a data network. VoIP works by sending voice information in digital form in packets, rather than in the traditional circuit-committed protocols of the publicly switched network.

The communications system 100 may further include any number of hardware and software elements that may not be shown in the example of FIG. 1. For example, in order to facilitate VoIP communications, the communications system and the MSC 102 and local exchange 104 in particular, may include application servers, media servers, service brokers, call agents, edge routers, gateways (signaling, trunking, access, sub, etc.), IP network service providers, exchanges, switches, users, and networks. The billing system 108 is similar to the billing system 106 except that it is equipped to handle billing for landline customers rather than wireless customers. The local exchange 104 or other components of a wire line network such as data, PSTN, VoIP, or other wired network may implement the features and perform the methods herein described.

The MSC 102 and local exchange 104 may include an authentication space or verification modules. The authentication space may be a partition of the server or other storage designated by the communications service provider. The authentication space may validate that a user or device, such as client 126, is allowed to authorize the MSC 102 or local exchange 104 or corresponding billing system 106 and 108 to set preferences, implement changes, review information, or perform other updates. For example, a user may be first required to provide a secure identifier, such as a user name, password, or other authentication code or hardware interface that verifies the user is authorized to make changes within the authentication space. The authentication space may further verify information or messages managing billing settings received through an integrated voice response system (IVR), email, or short message service (SMS).

The authentication information may be used to create a secure connection between the client and the MSC 102 and local exchange 104. The secure connection may be a virtual private network tunnel, an encrypted connection, firewall, or other form of secured communications link The MSC 102 and local exchange 104 may use any number of gateways, proxies, applications, or interfaces for allowing the client 126 to the MSC 102 and local exchange 104 through the wired network 118. Alternatively, the client 126 may use a wireless network or other network to access the MSC 102 and local exchange 104. The MSC 102 and local exchange 104 may use a host client application for communicating with numerous clients.

The home 120 is an example of a dwelling or residence of a person or group that may use any number of communications services. The home 120 is shown as a residence in the illustrated example; however, the home 120 may also be an office, business, or other structure wired or otherwise suitably equipped to provide telephone, data, and other communication services to one or more customers. In one embodiment, the home 120 is equipped with multiple communication devices, including home telephones 122 and 124 and client 126. The home telephones 122 and 124 may be standard devices that provide dial tone and dialing, and voice conversation capabilities. Home telephone 122 may be integrated in any number of other devices or may be used in different forms. For example, the home telephone 122 may be part of a refrigerator. In another embodiment, the home telephone 124 may be integrated with a personal computer, such as client 126.

Client 126 may be a personal computer for performing and executing programs and instructions and accessing the wired network 118. However, the client 126 may be any computing devices suitable for communicating with the wired network 118. The wired network 118 may be a fiber optic, cable, telephone network, or other wired network suitable for communicating over a hard-wired connection with the client 126. In one embodiment, the home 120 may include a wireless router that allows the client 126 to communicate with the wired network 118. The MSC 102 and local exchange 104 may use a graphical user interface (GUI), such as website or program accessible from the client 126, in order to receive user input for the billing systems 106 and 108.

Additionally, the user may provide user input through an IVR, email, SMS, or other messaging service to manage or review billing information. For example, the user may send a text message with the subject account balance to receive a record of all recorded billing for the month. In another embodiment, the user may set preferences to receive an update each time a call made to a billing party is recorded to provide accurate updates and increased information availability.

In one embodiment, the user may be required to sign up for a service package or billing feature in order to be granted access to the billing system 106 and 108 for the separation and accounting of billing expenses. For example, the GUI may be used to review normal billing invoices and calls unless the user has subscribed to a specialized billing separation service plan. If the user has subscribed to the specialized communications plan or feature, the GUI may be enabled to allow the user to provide user input for separation of communications before, during, or after they occur.

The communication services accessible from the home telephones 122 and 124 may include standard telephone service or VoIP telephone service. The home telephones 122 and 124 may be VoIP telephones or standard telephones that include a modem and/or VoIP adapters for enabling VoIP communications.

In an illustrative embodiment, the user may select a category for billing purposes using devices such as wireless devices 112 and 114, home telephones 122 and 124, and client 126. Calls and other messages and data communications may be made and received from the home telephones 122 and 124, wireless devices 112 and 114, and client 126. At anytime, a user may select to enable, order, initiate, configure, reconfigure, or otherwise establish the billing method herein described. The user may enable billing to a specified category in a number of ways.

For example, the user may use a command that informs the MSC 102 or local exchange 104 or billing systems 106 and 108 how to categorize the communications for billing. The command may be a signal generated to activate a function trigger for a device such as the MSC 102, local exchange 104, billing systems 106 and 108, wireless device 112 and 114, home telephones 122 and 124, or client 126. In one example, the user may submit a command to categorize the communications to a business account by dialing *2 on the home telephone 122. The command may also be a password, voice command user selection or any other suitable option, setting, command, or user input.

Figure 2:
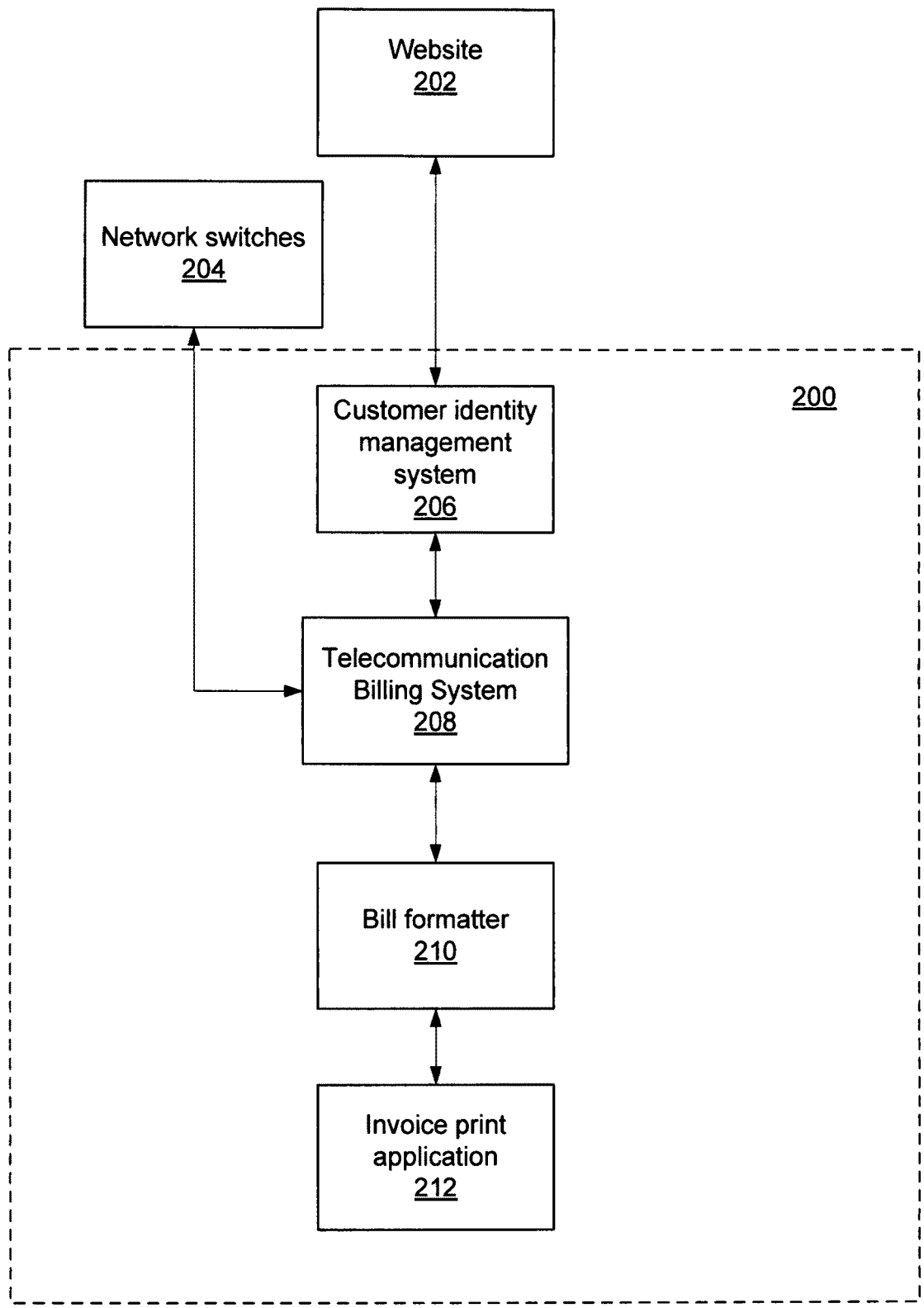
FIG. 2 is a block diagram of a billing system in accordance with an illustrative embodiment.

FIG. 2 is a block diagram of a billing system in accordance with an illustrative embodiment of the present invention. FIG. 2 is a block diagram of a billing system 200, a website 202, and network switches 204. The billing system 200 may include various components including a customer identity management system 206, a telecommunication billing system 208, a bill formatter 210, and an invoice print application 212. The billing system 200 may be operated by a business, organization, group, or individual. In another embodiment, the billing system 200 may be operated by a communications service provider on behalf of the billing party. The billing system 200 may be used to record, track, and bill for communications expenses and hourly fees, base fees, flat fees, or other costs that may be linked to the length or type of communications. For example, a user that calls a stock broker may be billed for the cost of a trade regardless of whether a trade is executed or not on behalf of the user. In another embodiment, a user calling her attorney may be billed for the communications-related expenses and the hourly billing rate of the attorney for the duration of the phone call. As a result, the user may be able to track expenses for budgeting purposes and in order to provide better satisfaction with the time or communications billed to the user.

In one embodiment, the customer identity management system 206, the telecommunication billing system 208, the bill formatter 210 and the invoice print application 212 may be part of a server, exchange, or advanced intelligent device which may include numerous software engines, applications, and programs. The server may include a processor, memory, and the other components of a telecommunications management device. The server may store and execute the engine or a set of instructions to categorize the communications and related expenses based on a user designation. In particular, the programs or instructions ran by the server may allow the telecommunications service provider to implement a billing service plan that separates the communications and expenses or a billing feature to do the same.

The website 202 may be used to display information to the user and to receive user input. In one embodiment, the user may manage expense allocation for tax and accounting purposes using the website 202. In one embodiment, the website 202 may display a graphical user interface (GUI) as shown and further described in FIG. 7. The website 202 allows the user to specify categories and/or projects to which outgoing communications expenses and charges are designated. In one embodiment, the user may have a single business account to which expenses and charges may be allocated. In other embodiments, the categories may allow for multiple users, separate projects and a nearly limitless amount of categories as specified by the user. For example, within a business category, the user may specify that communications expenses may be billed to project XYZ or QRS. Alternatively, the user may designate numbers, codes or other identifiers that may be associated with one of a number of projects. By using categories and projects, the expenses are further separated for accounting, expense, and reimbursement purposes. For example, the user may further bill a secondary client for communications performed on the client's behalf, but needs an accurate record for sending the data even if the communications are performed from the user's wireless device or home VoIP connection. When selecting a category, the user may also specify the project number using key strokes, voice recognition, or other forms of user input.

The billing is performed for outgoing calls made by the user as a caller and received by another party that will bill the user. The website 202 may further provide a billing interface for the user to receive bills, view costs, and view minute and time usage of the called party. In many situations, a user is billed for time spent receiving counsel, advice, or other services from a called party. The website 202 may allow the user to view the communications-related expenses. In another embodiment, the user may also view the related hourly fees or cost for speaking with the called party.

The billing system 200 further includes network switches 204. The network switches 204 send and receive data communication signals from a user and/or other network devices necessary for performing the specified communication. In one embodiment, the network switches 204 include all of the necessary components that allow the user to carry on a VoIP conversation. The network switches 204 may communicate with the telecommunication billing system 208.

In one embodiment, the features and functionality of the website 202 may be enabled only if the user has selected a communications service plan that includes the billing separation functionality as a feature. For example, the user may be charged an additional five dollars a month per account in order to be able to separate expenses as herein described. These charges may be levied by the business, organization, group, or individual the user calls. Alternatively, the billing separation features herein described may be provided to every user of a communications service provider in order to encourage users to receive more accurate billing and communication information.

The telecommunication billing system 208 may track expenses and costs associated with the user's one or more telecommunications services. For example, the telecommunications billing system 208 may record long distance charges and minutes made by the user to a called party for long distance phone calls. The network switches 204 may similarly communicate wireless signals to a called party for wireless communication. The telecommunication billing system 208 is in communication with the network switches 204 to track and record the amount of minutes used for making and receiving calls, text messages, chatting and performing network access features such as accessing the Internet.

The customer identity management system 206 validates that a user or customer is authorized to access the website 202. For example, as previously mentioned, the customer identity management system 206 may provide only limited or partial access to the telecommunication billing system 208 if the user has subscribed to the billing service plan or a communications package that incorporates the service plan. If the user has not purchased the billing service or the communications service provider does not provide it to all customers, the customer identity management system 206 may allow the user to access only certain features or prevent access to the telecommunication billing system 208. The customer identity management system 206 may also communicate information from the website 202 to the telecommunication billing system 208. In one example, the customer identity management system 206 may set criteria, rules, policies, user preferences and other user input used to categorize communications into the categories to the telecommunication billing system 208. The telecommunication billing system 208 may communicate recorded information regarding telecommunication usage to the bill formatter 210.

The bill formatter 210 may format the data received from the telecommunication billing system 208 to a format and layout that may be passed to the invoice print application 212. In particular, the format may divide the communications expenses, hourly expenses, flat fees, base costs, or other expenses and costs by category based on the user input so the user may easily ascertain what expenses have been accrued. The invoice print application 212 may be used to print an invoice or billing record for the user. Alternatively, the invoice print application 212 may electronically format a bill or invoice to be displayed to the user through the website 202 via an email message or an electronic interface. The billing cycle may dictate how and when the invoice print application 212 formats a bill for transmission to the user. Alternatively, the bill formatter 210 and invoice print application 212 may categorize information received from the telecommunication billing system 208 for continuous output to the website 202. As a result, the user may determine at any given time the amount of expenses belonging to each category and usage levels. The invoice print application 212 may also coordinate printing and mailing of a paper format invoice or bill to the user.

Figure 3:
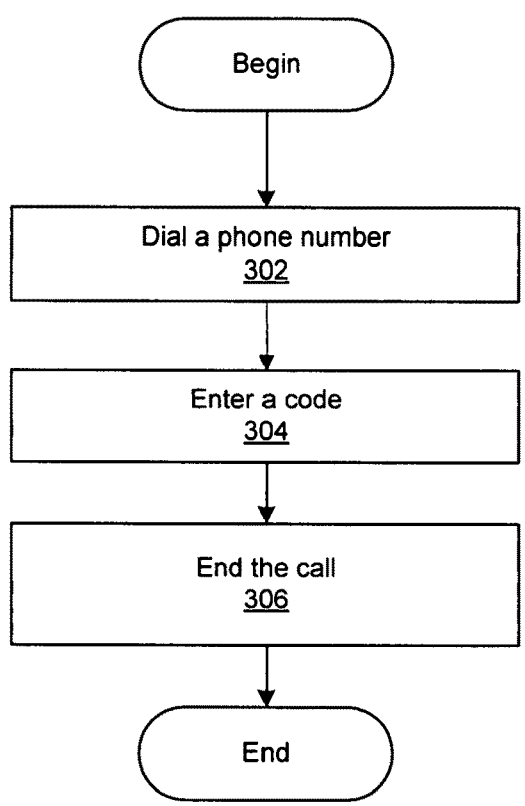
FIG. 3 is a flowchart of a process for selecting a code in accordance with an illustrative embodiment.

FIG. 3 is a flowchart of a process for selecting a category in accordance with an illustrative embodiment. The process of FIG. 3 may be performed by a user accessing a telephonic device such as a wireless phone, POTS telephone, or VoIP telephone. The process begins with the user dialing a phone number (step 302). The number dialed may be associated with a business, organization, group, or individual, with whom the user has a business or personal relationship. The call may be a standard voice only telephone call or it may incorporate media elements, such as video conferencing or calling. By dialing the phone number 302, a call is initiated and an automated system may answer or intercept the call.

Next, the user enters a code (step 304). The code may be a password, voice identification, pin number, or other customer identifier for billing the user for the call. The customer identification may have been previously assigned to the user or a number of associated individuals. As a result, all of the costs associated with the phone call, which may include communications expenses, personal time, and professional fees, are recorded for the duration of the phone call in response to step 304. In one embodiment, the code may include a base number identifying the user and a subsequent number identifying a specified project, category, or matter. For example, general business calls may have a different code or portion of the code than tax related calls. For example, the user may enter a code, such as 448323, and a subsequent number of 292 to bill the expenses incurred when calling the wireless device of the user's lawyer. The lawyer's hourly rate of two hundred and fifty dollars an hour may also be tracked relative to the length of the call for subsequent review by the user's lawyer and/or the user. The tracking of outgoing calls provides for more transparency in subsequent billing and further enhances financial relationships.

In some cases, the user may have established a matter number if the matter or project is not specified when the code is entered. For example, all calls may be categorized to a general business category unless the user input is recovered indicating otherwise. Next, the user ends the call (step 306). Once the user has ended the call the user may be able to verify the duration of the call and any costs associated with the call through the telephonic device used to make the call or through a website. In one embodiment, once the call has ended, the user may enter a number or request to hear a breakdown of the billing for the call for budgeting purposes or to make sure that the expenses are correct.

Figure 4:
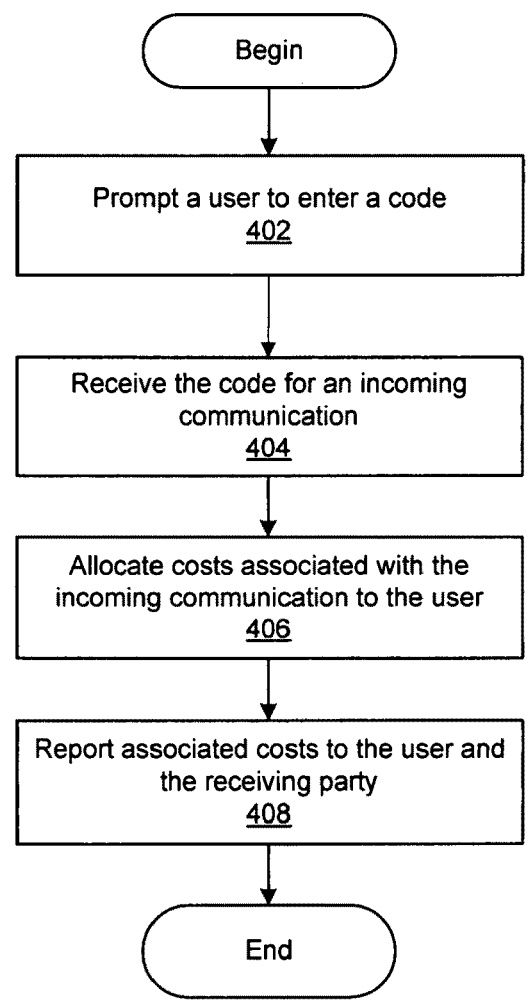
FIG. 4 is a flowchart of a process for allocating costs in accordance with an illustrative embodiment.

FIG. 4 is a flowchart of a process for allocating costs in accordance with an illustrative embodiment. The process of FIG. 4 may be implemented by a billing system or database of a wired or wireless network The process may be initiated in response to receiving a call from a user. The process begins by prompting a user to enter a code (step 402). The prompt may be an automated message, tone, or other indicator that informs a user that it is appropriate to enter a code. In one embodiment, the user may have been previously informed of the ability to enter a code in order to better track expenses associated with the call.

Continuing, the billing system receives the code for an incoming communication (step 404). The code may be received from a user before or after the user initiates or sends the outgoing communication. The category code may also be received based on a specialized pass code, password, or button of a telephonic device.

Next, the billing system allocates the costs associated with the outgoing communication to the user (step 406). In one example, if the user is using a VoIP telephone and has specified a business code, the long distance charges and expenses associated with the long distance call are categorized as expenses for the user. In another example, the person receiving the call may be using a cellular phone, and as a result, the cost for the minutes and the previously discussed hourly or per-call rate is similarly applied. In another embodiment, the billing system may have received a specified project number in addition to the code in step 404 so that the costs and/or expense may be billed to the specified category.

The categories may represent a visual or physical separation in data. In one example, each code is saved in a separate file. In another example, each communication is marked with a designator or identifier indicating the relevant user billing invoice. The billing system may further apportion costs to user-designated projects within each user profile as pre-defined by criteria or specified by the user. Expenses associated with communications, as well as a portion of the monthly service fee and taxes, may be apportioned to each category for more reasonable and accurate accounting.

The billing system reports associated costs to the user and the receiving party (step 408). The costs and expenses associated with each category may be reported in step 406 using any number of methods. In one embodiment, an invoice or bill may be emailed to the user. In another embodiment, the user may receive a hard copy through a traditional paper billing system. Alternatively, the report may be displayed to a user using a database or graphical user interface accessible by the user through a network connection. The report of step 408 preferably shows all communications for the month or designated time period and associated costs for each. Each communication may also show time, duration, costs, hourly rates, flat fees, commission, base fees, expenses, relevant codes, and other helpful or relevant information.

In one embodiment, the user may use a personal computer and Internet application to access web resources provided through the billing system or with access to the billing system. The user may specify the code, project number, password, or other information being billed for the communications made by the user. In another embodiment, the user may manage a number of different users that may call the receiving party. For example, a number of in-house attorneys may call outside counsel and may be billed collectively for the associated telecommunications costs and hourly fees of the outside counsel. As a result, any communications between the user and the receiving party are associated for billing purposes allowing for better accounting and cost management.

Figure 5:
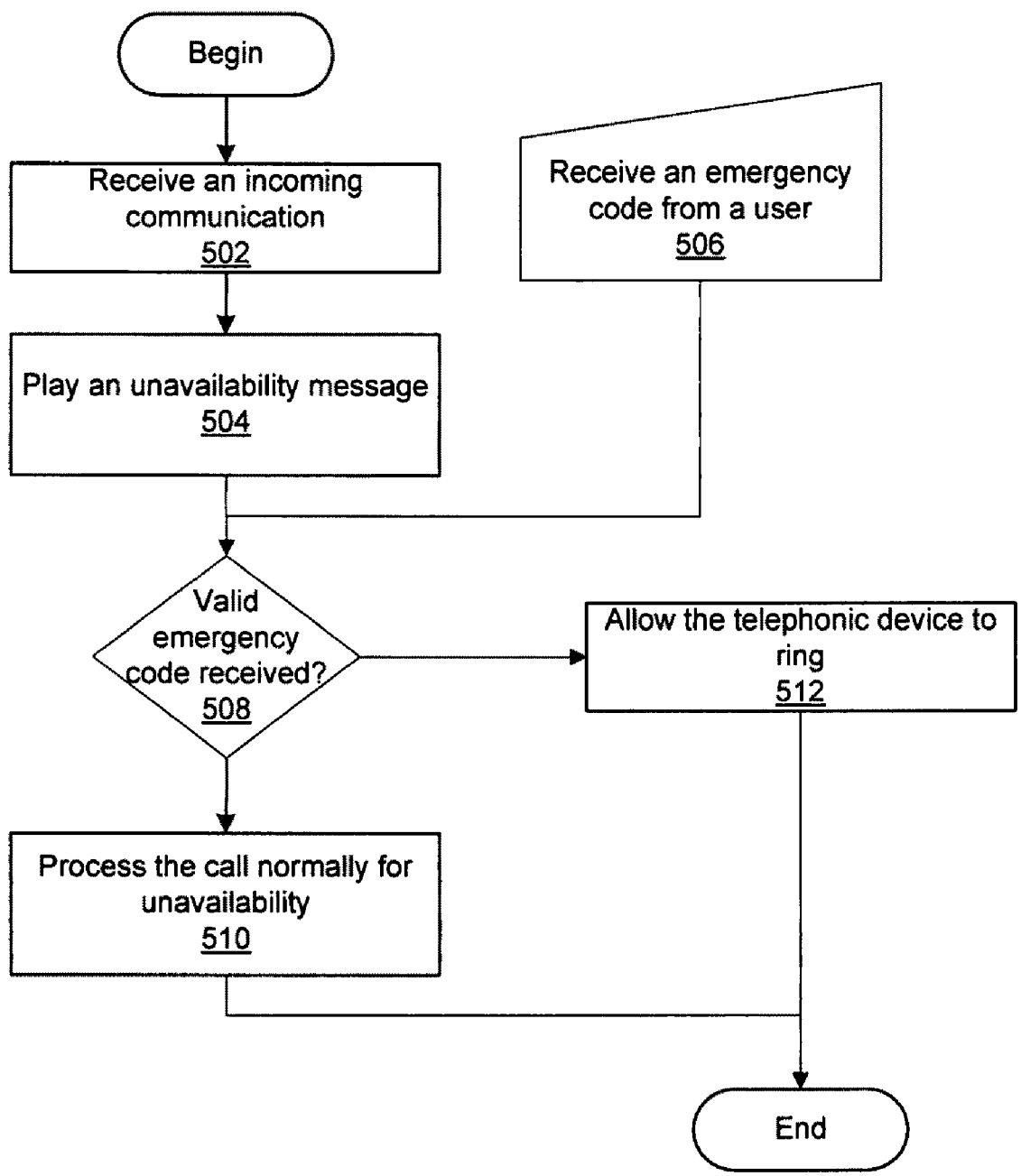
FIG. 5 is a flowchart of a process for emergency dialing in accordance with an illustrative embodiment.

FIG. 5 is a flowchart of a process for emergency dialing in accordance with an illustrative embodiment. The process of FIG. 5 may be implemented by a communications system, billing system, or wireless device in accordance with illustrative embodiments of the present invention. The process may be implemented by a server, MSC, IP telephone, or wireless device hereinafter referred to as a "device". The process may be particularly useful for wireless devices based on the availability of the user. The process may be implemented for a device that has activated or requested a do-not-disturb, blocking, or other feature preventing a telephonic device from ringing. In particular, the recognition of the an emergency dialing code may be integrated with a billing system for ensuring that important or critical personal or business communications may occur under specified conditions.

The process begins by receiving an incoming communication (step 502). The incoming communication may be a phone call, video call, telephonic chat session or other similar communication. The device then plays an unavailability message (step 504). The message of step 504 may depend on the type of feature being used. For example, the user may have set an incremental do-not-disturb feature so that an automated message specifies a time period during which the user is unavailable. For example, the message may say "The caller you have dialed is temporarily unavailable." The message may be a default message or customized message based on the user's preferences.

Next, the device may receive an emergency code from a user (step 506). The emergency code may be received at any time after the phone number is dialed based on the actions of a user. In one embodiment, the emergency code may be received as the unavailability message is being played or afterward. The device may not prompt a user to input an emergency code. As a result, the emergency code may be available only to individuals with whom the user has personally informed or shared the emergency code with.

The emergency code may also be a code that is for allocating expenses for business purposes. The emergency code may be used for personal or business purposes. For example, if a user is unable to reach the party because of a do-not-disturb feature, the user may enter a code such as "062177" that indicating an emergency call. The emergency code may also be a specific project or matter number. For example, after entering a client number, the user may enter 911 indicating the user's immediate need to reach the dialed party. In one embodiment, the emergency code may be a keyword or phrase, such as "help" or "emergency." The device may use voice recognition software to detect and identify the speech as an emergency code.

Next, the device determines whether a valid emergency code is received (step 508). The determination of step 508 may be made based on certain criteria, factors, or other information previously submitted by the user. The dialed party may have previously specified any number of different emergency codes for family members, associates, employees, or other individuals who may need to contact the dialed party during an emergency. In one embodiment, the user may be prompted to enter a valid emergency code if the code is not received the first time. For example, the device may prompt the user to enter an emergency code three times before the determination is made that a valid emergency code is not received.

If a valid emergency code is not received, the device processes the call normally for unavailability (step 510). The call is processed normally if an emergency code is not entered or if the an incorrect code is entered. The call process of step 510 may include providing additional contact information for the dialed party, referencing alternative numbers, or sending the call to a voice mail, an operator, or other automated system. In another embodiment, the call may simply continue to ring without response or end.

If a valid emergency code is received in step 508, the device allows the telephonic device to ring (step 512). The call is connected to the user allowing the user to answer or ignore the call. In one embodiment, the device may automatically answer the phone and activate a speaker of the phone in case the user is not near enough to answer or reach the phone. The user may have set preferences for the type of ring allowed for emergency dialing. For example, the device may be set to ring, vibrate, flash, auto-answer, activate a speaker, or otherwise enable communication.

Figure 6:
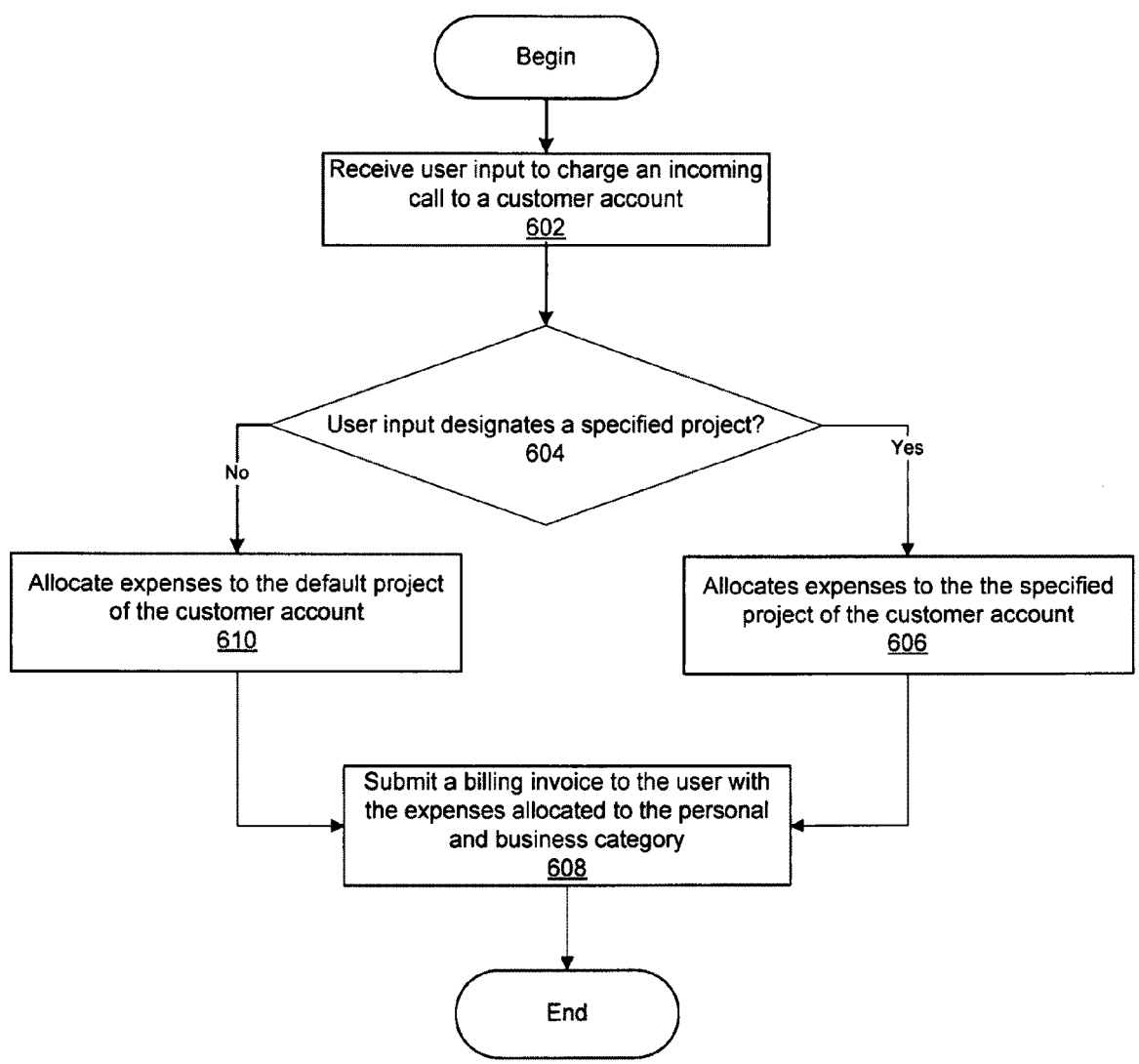
FIG. 6 is a flowchart of a process for allocating costs for calls in accordance with an illustrative embodiment.

FIG. 6 is a flowchart of a process for allocating costs for calls in accordance with an illustrative embodiment. The process of FIG. 6 may be implemented by a billing system as previously described. The process of FIG. 6 begins by receiving user input to charge an incoming call to a customer account (step 602). The user input may be a code, password, keyword, or other user input. The user input may be a single number sequence or multiple number used to select a partition or folder of the customer's account.

Next, the billing system determines whether the user input designates a specified project (step 604). The determination of step 604 may be based on user input received from the user at the time the call was placed. For example, the user may have pressed *2458 after dialing the receiving party to specify a certain project within the customer account or for a separate customer account. As a result, the call may be designated to a product development project. Alternatively, the user may have previously established a criterion specifying that all calls not otherwise designated are billed to a default or general customer account. The user may have also established criteria for separating expenses to different projects or sub-projects within the customer account.

If the user input designates a specified project in step 604, the billing system allocates expenses to the specified project of the customer account (step 606). Next, the billing system submits a billing invoice to the user with the expenses allocates to the customer account or specified projects (step 608). The billing invoice may be submitted through email, a web interface, or traditional paper means as previously described. The billing invoice may be submitted to the user at the end of a specified period, such as once a month. The billing invoice may also be reviewed or managed by the billing party before it is sent to the user. In one example, the user may reduce, delete, and otherwise manage billable charges that are automatically billed to the user for making calls. The billing party may not bill the user in order to enhance good will, because the conversation was not productive, or because the billing was otherwise incorrect. For example, before the user is billed in step 608, the billing party may be required to approve or disprove all of the charges.

If the user input does not designate a specified project in step 604, the billing system allocates expenses to the default project of the customer account (step 610). The default project may be a sole project or the balance of the customer account. Next, the billing system submits a billing invoice to the user with the expenses allocated to the customer's account or specified projects (step 608).

FIG. 7 is a graphical user interface in accordance with an illustrative embodiment. The graphical user interface 700 may be displayed to a user using a client, such as client 126 of FIG. 1. The graphical user interface 700 may be used to display and manage expense allocation before, during, and after communications occur by establishing codes, project numbers, manually moving communications related expenses, setting user preferences, and providing user input. The graphical user interface 700 may also be part of an interactive message, such as an email message, SMS message, or information available through an IVR. For example, the graphical user interface 700 may be emailed or text messaged to the calling party and receiving party each time a communication occurs or each time a communication with a cost above a specified threshold occurs.

In one embodiment, the graphical user interface 700 may be displayed to the user only if the user has signed up for or subscribed to a communications service plan or billing feature. The added features of the graphical user interface 700 and enhanced billing system provide a method of saving employee and employer time, effort, and expense to properly account for different categories and types of expenses.

For example, the graphical user interface 700 may be part of a web browsing application with content populated by a communications service provider such as website 202 of FIG. 2. Alternatively, the graphical user interface 700 may be printed in the form of a billing or invoice statement sent to the user. The graphical user interface 700 may also be integrated in an email that is sent to the user at the end of a billing cycle. The graphical user interface 700 may include numerous elements, such as a user name 702, a password 704, a customer code 706, an add project designator 708, an emergency dialing selection 710, an emergency dial number 712, communications expenses 714, phone numbers 716 and 718, cost per minute 720 and 722, hourly rates 724 and 726, flat fee cost 728, caller identification 730 and 732, dates 734 and 736, minutes 738 and 740, total costs 742 and 744, summed minutes 746 and 748, and overall costs 750 and 752.

The user name 702, password 704 and customer code 706 may be used by a website or authentication system to determine whether a user and/or billing party may access the graphical user interface 700. The customer code 706 may be the code provided to bill calls and access the account. The password 704 may be required in addition to a username or customer code in order to access the graphical user interface 700. The graphical user interface 700 may be used to view balances, manage preferences, print invoices, or otherwise allow interaction between the user and the billing party. For example, the user may be able to place comments or questions in a field regarding phone calls or the billing applicable to one or more methods of communications.

The user may use the graphical user interface 700, the add project designator 708, and the category designator 710 to add new projects or amend the customer code 706. For example, the user may be an engineering manager that frequently consults with an independent consultant regarding safety features. The customer code and a subsequent project number may be used to identify current projects and accurately bill the user for phone calls, expenses, and time of the consultant.

The emergency dialing selection 710 may allow a user to activate a feature needing emergency dialing. For example, when a user inputs the emergency dialing number 712, alone or in conjunction with the customer code 706, the user may be able to reach the receiving party or dialed party even if the receiving party has activated a do-not-disturb or other similar feature on their telephonic device. In one embodiment, the user may dial the customer code 706, 24548 and then a subsequent number 211 in order to break through during an emergency call. The emergency dialing number 712 may be used in the cases of business, personal, or other emergencies. For example, the user may enable a generic emergency dialing number 712 that may be used to contact any number of users in order to access the dialed party regardless of the phone or network status that may normally prevent the call from being completed. The emergency dialing number 712 may be set by the user or the billing party based on a mutual agreement or based on the user's input.

The graphical user interface 700 may allow a billing party to manage expenses for calls made to any number of phone numbers, such as, phone number 716 and 718. The communication expenses 714 may show the details of how the user is built for incoming calls. For example, when the user calls the phone number 716, the cost per minute 720 is 5¢ per minute and the hourly rate 724 for dialing that number is $200.00 per hour. In one example, the phone number 716 may be the work number of a billing party.

In another embodiment, for the phone number 718, the cost per minute 722 is 20¢ per minute. Similarly, the hourly rate 726 is $250.00 per hour and there is a flat fee cost 728 of $5.00 per call regardless of the length of the call.

In one embodiment, the phone number 718 may be a personal or wireless number for the billing party. As a result, the cost per minute 722, hourly rate 726, and flat fee 728 represent a higher cost to potential callers because of the personal expense to the billing party or because the billing party may be answering the call during personal time. The communication expenses 714 under the phone number 718 represent the higher cost of calling the billing party after hours or on the wireless device as opposed to the phone number 716.

In other embodiments, the communication expenses 714 and the graphical user interface 700 may allow any number of phone numbers to be entered as well as costs, hourly rate, flat fees, and additional expenses associated with incoming communications, including calls, video conferences, text messages, e-mails, or other similar communications.

The caller identification 730 and 732 may be used by the user and the billing party to further determine who made the calls and when the calls were made, as well as the duration of the calls and the total cost. The caller identification 730 and 732 may show from where the call originated. The dates 734 and 736 may show the dates on which the user called the billing party. The minutes 738 and 740 represent the duration or time of the call. The total costs 742 and 744 represent the costs for each individual call, including the cost per minute 720 and 722, the hourly rate 724 and 726 and the flat fee cost 728 for the phone number 718, respectively.

The total minutes 746 and 748 may represent the minutes or time used to call the billing party during a particular billing cycle or for a specified day or other time period. The overall costs 750 and 752 represent the costs for the time period. For example, the user may have accrued expenses of $542.33 for the overall cost $748.00 during the month of January and a similar overall cost $750.00 of $618.90 during that same period. The total cost 742 and 744 may be calculated by taking the number of minutes and multiplying the cost per minute 720 and 722 by the minutes 738 and 740 to generate a communication expense. The flat fee cost 728 may be added to the cost of calls made to the phone number 718 representing an increased cost of doing business at that phone number. The minutes 738 and 740 may be further multiplied by the applicable hourly rate 724 and 726 to determine the cost of the billing partys time per hour and then added to the communications expenses to generate the total costs 742 and 744. The minutes 738 and 740 are fractionally calculated so that the costs directly relates only to the time the user spent on the phone.

The graphical user interface 700 may also be used by a billing party to write off expenses associated with one or more calls. For example, the billing party may determine that a call made on the fifth of the month was mostly spent discussing personal matters and, as a result, the calling party should not be billed for that information.

The illustrative embodiments provide a system and method for a dialing or calling party to be billed for communications, hourly, and other expenses or costs. The calling party may review costs as they are accrued providing greater satisfaction with services and better information for accounting and budgeting. As a result, the calling party is less likely to be dissatisfied about a later submitted bill or feel that the charges are incorrect or unfair.

The previous detailed description is of a small number of embodiments for implementing the invention and is not intended to be limiting in scope. The following claims set forth a number of the embodiments of the invention disclosed with greater particularity.

What is claimed:

1. A method for billing a communication between a calling party and a receiving party, the method comprising:
   prompting the calling party to enter a code for categorizing billing for the communication;
   receiving the code as user input from the calling party during the communication;
   allocating expenses of the communication to an account of the calling party based on the code received from the calling party, wherein the expenses are managed by the receiving party; and
   generating an invoice for the calling party specifying the expenses.

2. The method according to claim 1, wherein the code is an account identifier.

3. The method according to claim 1, wherein the communication is for any of a voice over Internet Protocol telephone, a wireless telephone, a digital telephone, and an analog telephone.

4. The method according to claim 1, wherein the receiving is performed after the calling party dials a phone number associated with the receiving party.

5. The method according to claim 1, wherein the receiving, allocating and generating is performed by a billing system of the receiving party.

6. The method according to claim 1, wherein the expenses include communications fees and an hourly rate of the receiving party.

7. The method according to claim 1, further comprising:
   managing the billing of the expenses using an interface available to the receiving party.

8. The method according to claim 1, wherein the invoice is updated based on each of a number of communications, and wherein the invoice is reviewable through a website or interactive voice recording or sent in an email message or short message service message.

9. The method according to claim 1, wherein the code is an emergency dialing code configured to allow the calling party to communicate with the received party even though a do-not-disturb feature is activated by the receiving party.

10. The method according to claim 9, further comprising:
    communicating the communication as if the do-not-disturb feature is not activated in response to receiving the emergency dialing code.

11. The method according to claim 9, wherein the emergency dialing code is set by the calling party and approved for activation by the receiving party.

12. The method according to claim 6, wherein the expenses are calculated based on the duration of the call.

13. The method according to claim 7, wherein the receiving party manages the expenses through the interface by reducing or canceling the expenses.

14. A billing system for separating billable expenses, said system comprising:

a server configured to:

track the billable expenses associated with a communication between a calling party and a receiving party, based on a code for categorizing billing for the communication received as user input during the communication from the calling party in response to a prompt from the system; and allocate the billable expenses related to the communication to an account of the calling party at the end of the communication code received from the calling party, wherein the expenses are managed by the receiving party; and a communications network in communication with the server, the communications network configured to receive the communication from the calling party.

15. The billing system according to claim 14, further comprising:

an interface displayable by the server, wherein the interface displays the billable expenses associated with the account to the calling party and a receiving party.

16. The billing system according to claim 14, wherein the code is an emergency dialing code configured to allow the calling party to communicate with the received party even though a do-not-disturb feature is activated by the receiving party.

17. The billing system of claim 14, wherein the billable expenses include a communication cost and a hourly or flat fee cost for speaking with the receiving party for a duration of the communication.

18. A billing system for billable expenses related to a communication between a calling party and a receiving party, the billing system comprising:

a processor for executing a set of instructions;

a memory for storing the set of instructions, wherein the set of instructions prompt the calling party to enter a code for categorizing billing for the communication, receive the code as user input from the calling party during the communication, allocate the billable expenses of the communication to an account of the calling party based on the code received from the calling party, wherein the expenses are managed by the receiving party, and generate an invoice for the calling party specifying the billable expenses for communication from the receiving party to the calling party.

19. The billing system according to claim 18, wherein the code is received before a call, and wherein the code is an account identifier.

20. The billing system according to claim 18, wherein the code is an emergency dialing code configured to allow the dialing party to communicate with the received party even though a do-not-disturb feature is activated by the receiving party.

* * * * *